US009562711B2

(12) United States Patent
Pape

(10) Patent No.: US 9,562,711 B2
(45) Date of Patent: Feb. 7, 2017

(54) METHOD AND APPARATUS FOR STORING AND DISPENSING BAGGED ICE

(71) Applicant: Reddy Ice Technology LLC, Dallas, TX (US)

(72) Inventor: Henrik Pape, Horsens (DK)

(73) Assignee: REDDY ICE TECHNOLOGY LLC, Dallas, TX (US)

( * ) Notice: Subject to any disclaimer, the term of this patent is extended or adjusted under 35 U.S.C. 154(b) by 753 days.

(21) Appl. No.: 13/739,391

(22) Filed: Jan. 11, 2013

(65) Prior Publication Data
US 2014/0199151 A1 Jul. 17, 2014

(51) Int. Cl.
B65B 63/08 (2006.01)
F25C 5/00 (2006.01)
B65G 57/03 (2006.01)
F25C 5/18 (2006.01)
B65G 57/30 (2006.01)
F25D 25/00 (2006.01)

(52) U.S. Cl.
CPC .............. *F25C 5/007* (2013.01); *B65G 57/03* (2013.01); *B65G 57/30* (2013.01); *F25C 5/002* (2013.01); *F25C 5/182* (2013.01); *F25D 25/00* (2013.01)

(58) Field of Classification Search
CPC ........... F25C 5/007; F25C 5/182; F25C 5/002; F25D 25/00; F25D 13/06; F25D 13/062; F25D 25/04; B65G 57/03; B65G 57/30; B65B 43/52
USPC ...................................................... 414/794.4
See application file for complete search history.

(56) References Cited

U.S. PATENT DOCUMENTS

| 2,116,300 A | 5/1938 | Campos |
| 2,272,530 A | 2/1942 | Patterson |
| 2,322,175 A | 6/1943 | Talbot et al. |
| 2,334,256 A | 11/1943 | Eaton |
| 2,582,381 A | 1/1952 | Higginbottom |

(Continued)

FOREIGN PATENT DOCUMENTS

| CN | 2150499 Y | 12/1993 |
| EP | 0459050 A1 | 12/1991 |

(Continued)

OTHER PUBLICATIONS

Office Action and Search Report issued on Jan. 20, 2014 for related CN Patent Application No. 201180044860.X, in 10 pages.

Primary Examiner — Orlando E Aviles Bosques
(74) Attorney, Agent, or Firm — Haynes and Boone LLP

(57) ABSTRACT

An article storage and dispensing apparatus and method in which articles made by series production are distributed from an article supplier into a storage compartment of predetermined dimensions for storage of articles in front and rear rows of article storage positions. An article distributor in an upper portion of the storage compartment has a carriage, a carriage drive configured to drive the carriage in a reversible horizontal carriage drive direction across at least part of the width of the storage compartment, and an article support mounted on the carriage and configured to receive articles from the article supplier above the support when the carriage is in a start position. An article dispenser is associated with the article support to dispense articles selectively in opposite horizontal dispensing directions transverse to the carriage drive direction off the front and rear ends of the support to drop into front and rear article rows.

12 Claims, 10 Drawing Sheets

(56) References Cited

U.S. PATENT DOCUMENTS

| | | |
|---|---|---|
| 2,584,726 A | 2/1952 | McOmber |
| 2,649,235 A | 8/1953 | Edmonds |
| 2,669,377 A | 2/1954 | Poolen et al. |
| 2,777,264 A | 1/1957 | Schenk |
| 2,986,897 A | 6/1961 | Howard |
| 3,119,518 A | 1/1964 | Eschenburg et al. |
| 3,151,668 A | 10/1964 | Zimmerman |
| 3,211,338 A | 10/1965 | Weil et al. |
| 3,277,666 A | 10/1966 | Simmons |
| 3,323,280 A | 6/1967 | Rausch |
| 3,380,222 A | 4/1968 | Bergmann et al. |
| 3,416,620 A | 12/1968 | McClusky |
| 3,488,910 A | 1/1970 | Stoger et al. |
| 3,498,020 A | 3/1970 | Eppenberger |
| 3,501,887 A | 3/1970 | Umholtz et al. |
| 3,559,424 A | 2/1971 | Nelson |
| 3,608,657 A | 9/1971 | Johnson et al. |
| 3,608,786 A | 9/1971 | Shelley et al. |
| 3,610,482 A | 10/1971 | Van Steenburgh, Jr. |
| 3,618,733 A | 11/1971 | Winsett |
| 3,626,662 A | 12/1971 | Graveley |
| 3,643,798 A * | 2/1972 | Krupotich ............... B07C 5/165 |
| | | 209/564 |
| 3,654,771 A | 4/1972 | Kuebler |
| 3,688,471 A | 9/1972 | Clark et al. |
| 3,698,451 A | 10/1972 | Hudson |
| 3,712,019 A | 1/1973 | Lamka et al. |
| 3,715,119 A | 2/1973 | Shelley et al. |
| 3,719,307 A | 3/1973 | Larson |
| 3,788,566 A | 1/1974 | Morris, Jr. |
| 3,789,570 A | 2/1974 | Mullins, Jr. |
| 3,789,574 A | 2/1974 | Weikert |
| 3,807,193 A | 4/1974 | McKenney et al. |
| 3,822,866 A | 7/1974 | Daester |
| 3,830,266 A | 8/1974 | Hudson |
| 3,897,676 A | 8/1975 | Membrino |
| 3,903,674 A | 9/1975 | Brush et al. |
| 3,913,343 A | 10/1975 | Rowland et al. |
| 3,918,266 A | 11/1975 | Gindy et al. |
| 3,969,909 A | 7/1976 | Barto et al. |
| 3,974,625 A | 8/1976 | Simmons |
| 3,977,851 A | 8/1976 | Toya |
| 3,982,377 A | 9/1976 | Vanderpool |
| 4,013,199 A | 3/1977 | Brown |
| 4,027,459 A | 6/1977 | Nieskens et al. |
| 4,056,215 A | 11/1977 | Zwahlen |
| 4,074,507 A | 2/1978 | Ruf et al. |
| 4,088,243 A | 5/1978 | Deveson |
| 4,129,015 A | 12/1978 | Morris, Jr. |
| 4,132,049 A | 1/1979 | Mullins, Jr. |
| 4,136,803 A | 1/1979 | Tobias et al. |
| 4,137,689 A | 2/1979 | McClusky et al. |
| 4,139,029 A | 2/1979 | Geraci |
| 4,139,126 A | 2/1979 | Krasner et al. |
| 4,158,426 A | 6/1979 | Frohbieter |
| 4,189,063 A | 2/1980 | Matthiesen |
| 4,252,002 A | 2/1981 | Mullins, Jr. |
| 4,276,751 A | 7/1981 | Saltzman et al. |
| 4,320,615 A | 3/1982 | Gmur |
| 4,348,872 A | 9/1982 | Hill |
| 4,350,004 A | 9/1982 | Tsujimoto et al. |
| 4,368,608 A | 1/1983 | Ray |
| 4,404,817 A | 9/1983 | Cox, III |
| 4,409,763 A | 10/1983 | Rydeen |
| 4,420,197 A | 12/1983 | Dreiling |
| 4,461,520 A | 7/1984 | Alneng |
| 4,467,622 A | 8/1984 | Takahashi et al. |
| 4,478,386 A | 10/1984 | Mikkelsen |
| 4,487,093 A | 12/1984 | Peroutky |
| 4,522,292 A | 6/1985 | Euverard et al. |
| 4,527,401 A | 7/1985 | Nelson |
| 4,534,155 A | 8/1985 | Sawa et al. |
| 4,587,810 A | 5/1986 | Fletcher |
| 4,598,529 A | 7/1986 | Pongrass et al. |
| 4,612,779 A | 9/1986 | Hatton |
| 4,673,103 A | 6/1987 | Anderson et al. |
| 4,689,937 A | 9/1987 | Finan, Sr. et al. |
| 4,715,167 A | 12/1987 | Savigny |
| 4,732,301 A | 3/1988 | Tobias et al. |
| 4,765,488 A * | 8/1988 | Moriarity ................. B07C 5/36 |
| | | 177/123 |
| 4,803,847 A | 2/1989 | Koeneman et al. |
| 4,850,202 A | 7/1989 | Kito et al. |
| 4,878,523 A | 11/1989 | Balsamico et al. |
| 4,903,494 A | 2/1990 | Wigley |
| 4,909,696 A | 3/1990 | Wigley |
| 4,930,685 A | 6/1990 | Landers |
| 4,942,979 A | 7/1990 | Linstromberg et al. |
| 4,942,983 A | 7/1990 | Bradbury |
| 4,979,353 A | 12/1990 | Seppala |
| 4,981,237 A | 1/1991 | Landers |
| 4,995,219 A | 2/1991 | Hicks |
| 5,005,341 A | 4/1991 | Tetenborg |
| 5,009,060 A | 4/1991 | Furukawa |
| 5,027,610 A | 7/1991 | Hara |
| 5,056,299 A | 10/1991 | Furukawa et al. |
| 5,070,798 A | 12/1991 | Jurgens |
| 5,079,897 A | 1/1992 | Muller |
| 5,088,300 A | 2/1992 | Wessa |
| 5,108,590 A | 4/1992 | DiSanto |
| 5,109,651 A | 5/1992 | Stuart |
| 5,112,477 A | 5/1992 | Hamlin |
| 5,211,030 A | 5/1993 | Jameson |
| 5,277,016 A | 1/1994 | Williams et al. |
| RE34,533 E | 2/1994 | Wigley |
| 5,440,863 A | 8/1995 | Toya et al. |
| 5,473,865 A | 12/1995 | Tanaka et al. |
| 5,630,310 A | 5/1997 | Chadwell et al. |
| 5,722,215 A | 3/1998 | Yuyama et al. |
| 5,791,123 A | 8/1998 | Bolz |
| 5,813,196 A | 9/1998 | Page et al. |
| 5,822,955 A | 10/1998 | Woosley et al. |
| 5,832,700 A | 11/1998 | Kammler et al. |
| 6,112,539 A | 9/2000 | Colberg |
| 6,237,308 B1 | 5/2001 | Quintin et al. |
| 6,282,869 B1 | 9/2001 | Bullock et al. |
| 6,305,177 B1 | 10/2001 | Edwards et al. |
| 6,474,048 B1 | 11/2002 | Metzger et al. |
| 6,725,625 B1 | 4/2004 | Honma et al. |
| 6,862,866 B2 | 3/2005 | Jacobsen et al. |
| 6,904,765 B2 | 6/2005 | Lee et al. |
| 6,904,946 B2 | 6/2005 | James |
| 7,062,892 B2 | 6/2006 | Metzger |
| 7,331,163 B2 | 2/2008 | Hau et al. |
| 7,421,834 B1 | 9/2008 | Doolan |
| 7,426,812 B2 | 9/2008 | Metzger |
| 7,426,945 B2 | 9/2008 | Dalton et al. |
| 7,669,434 B2 | 3/2010 | Leclear et al. |
| 7,681,408 B2 | 3/2010 | Hobson et al. |
| 7,849,660 B2 | 12/2010 | Metzger |
| 7,958,918 B2 | 6/2011 | Ladson |
| 7,992,364 B2 | 8/2011 | Thurgood et al. |
| 8,122,689 B2 | 2/2012 | Pape |
| 8,299,656 B2 | 10/2012 | Allard et al. |
| 8,336,975 B2 | 12/2012 | Allard et al. |
| 8,353,146 B1 * | 1/2013 | Bareford ................. B65B 25/00 |
| | | 62/344 |
| 8,438,870 B2 | 5/2013 | Leclear et al. |
| 2003/0000180 A1 | 1/2003 | Singer |
| 2004/0216481 A1 | 11/2004 | James et al. |
| 2005/0115210 A1 | 6/2005 | Noumi |
| 2006/0021300 A1 | 2/2006 | Tada et al. |
| 2006/0090427 A1 | 5/2006 | Hau et al. |
| 2007/0175235 A1 | 8/2007 | Metzger |
| 2008/0047233 A1 | 2/2008 | Metzger |
| 2008/0110129 A1 | 5/2008 | LeBlanc et al. |
| 2008/0283145 A1 | 11/2008 | Maxwell |
| 2008/0295462 A1 | 12/2008 | Metzger |
| 2010/0011710 A1 | 1/2010 | Pape |
| 2010/0024363 A1 | 2/2010 | Pape |
| 2010/0170201 A1 * | 7/2010 | Aquarius ................. B65B 5/105 |
| | | 53/443 |
| 2010/0263335 A1 | 10/2010 | Pape |

(56) References Cited

U.S. PATENT DOCUMENTS

2010/0313524 A1   12/2010   Pape et al.
2012/0070264 A1   3/2012   Pape
2013/0255194 A1   10/2013   Metzger

FOREIGN PATENT DOCUMENTS

| EP | 1123884 A1 | | 8/2001 | | |
|---|---|---|---|---|---|
| EP | 1696192 A1 | | 8/2006 | | |
| FR | 2650559 A1 | | 2/1991 | | |
| GB | 943675 | * | 12/1963 | ............ | F25D 25/00 |
| GB | 1459629 A | | 12/1976 | | |
| GB | 2011633 A | | 7/1979 | | |
| JP | H1-33455 | | 10/1989 | | |
| JP | H2-41067 | | 3/1990 | | |
| JP | 05132007 A | | 5/1993 | | |
| WO | 200001582 | | 1/2000 | | |
| WO | 2008089762 A1 | | 7/2008 | | |

* cited by examiner

METHOD AND APPARATUS FOR STORING AND DISPENSING BAGGED ICE

FIELD OF THE INVENTION

The present invention concerns a method and apparatus for storing and dispensing articles, particularly bagged ice pieces or ice cubes.

BACKGROUND OF THE INVENTION

Articles manufactured by series production, particularly packaged articles such as bagged candy, bagged ice cubes, and the like, are often dispensed into a storage compartment of a refrigerated ice dispensing unit located in a store. Machines for making ice and delivering bags with loose ice cubes may be deployed in supermarkets. Such machines are designed with a top part with an ice cube machine and a central packing machine packing the ice cubes loosely in bags, and a lower part with a storage compartment from which the filled ice cube bags are supplied as the customer opens an access door to the storage compartment, providing himself or herself with a desired number of ice cube bags.

One problem with many such machines is that the bags fall down into the storage compartment over the same position. Over time, a stack of bags forms a pyramid. This causes the storage compartment to be badly utilized as it can only be partially filled, resulting in low capacity for a storage compartment of a given size. The pyramid of stacked bags rapidly reaches the top of the compartment, so bags cannot be added until some are removed for purchase. The problem has hitherto been solved by the staff in the supermarket performing a manual leveling of the ice cube bags in the storage compartment at short intervals.

Bagged ice dispensers or storage compartments may be dimensioned with a relatively high capacity in order to cope with peak loads. These may occur, for example, in connection with festivals or other events, or when the outdoor temperature rises suddenly because of change in weather. Ice making units of such dispensers may be unable to keep up with demand on such occasions, and stores then typically have bags of ice delivered by refrigerated trucks, requiring store personnel to transport the bags of ice from the truck to the storage compartment.

Both manual leveling and re-stocking of refrigerated ice dispensing units is a problem due to work safety considerations that limit the time in which the employees are allowed to work with frozen products, and a desire to release the employees' resources for other purposes in the supermarket.

Applicant's US Pat. App. Pub. No. 2012-0070264 describes a method and apparatus for distributing articles such as bags of ice into stacks in two side-by-side rows extending across the storage compartment or freezer compartment of an ice dispensing machine. This alleviates some of the problems encountered in prior art bagged ice dispensers. This apparatus has an article support which is moved in a first, horizontal direction back and forth above the two rows, and which is also rotated between first and second positions for dispensing articles into respective rows.

SUMMARY OF THE INVENTION

It is the object of the invention to provide a relatively compact and simple apparatus and method that evenly distributes articles, in particular bags containing ice cubes, in a storage compartment, particularly in an ice cube distribution machine in a supermarket, as well as other applications involving distribution of serially produced articles in a storage compartment where distribution of the articles in an even layer is wanted.

In one embodiment, an apparatus for distributing articles from an article supplier into a storage compartment is provided, which comprises a storage compartment having an upper end, a lower end, opposite sides, a front and a rear, the compartment being of predetermined dimensions for storage of stacked articles in front and rear stacked article rows which extend side-by-side across a storage area, each stacked article row having a plurality of article stacking positions along its length, an article distributor in an upper region of the storage compartment having a carriage associated with a carriage drive device which is configured to drive the carriage back and forth in a horizontal carriage drive direction, an article support mounted on the carriage and configured to receive articles from an article supplier above the support when in a first, article receiving position, the article support having opposite front and rear ends above the front and rear row, respectively, an article dispenser on the carriage configured to a dispense an article on the support selectively in opposite dispensing directions transverse to the carriage drive direction off the front and rear ends of the support to drop into a selected stacking position in the front and rear article rows. This is simpler and more compact than the prior apparatus since no rotation of the support is required and the articles are dropped into the two rows in the same orientation.

Articles may be dropped onto the lower wall or floor of the storage compartment for stacking and dispensing purposes, or a wheeled storage cart may alternatively be positioned in the storage compartment to define a storage area to receive stacks of articles in two rows. In the latter case, bags of ice or other articles may be retrieved by customers from the cart, or the cart may be removed and placed in a freezer storage area at the back of a store when filled to the desired capacity. Carts at the desired fill capacity may be replaced by empty carts as needed, and in times of high demand previously loaded carts may be retrieved and positioned in the storage compartment for dispensing purposes as needed.

In one embodiment, the storage compartment is relatively small and compact, so it does not take up a significant amount of space in a store, and may be dimensioned to receive two stacks of articles at the rear and two stacks of articles at the front of the storage area in a generally square array, either on the floor of the compartment or in a wheeled storage cart positioned in the storage area. A larger storage compartment for storing bags in three or more stacks per row may be provided in alternative embodiments.

In one embodiment, the article support comprises an article conveyor belt on the carriage and the dispenser comprises a second drive device configured to drive the conveyor belt in opposite front and rear directions to drive articles off the front and rear ends of the article conveyor belt, each article being received on the conveyor belt in a first orientation in which one side of the article faces upwards.

In one embodiment, a control system or controller is provided for controlling operation of the first and second drive devices to dispense articles into predetermined locations in the respective article rows, so that the heights of stacks of articles in each row are relatively uniform and space in the storage compartment is efficiently utilized. The control system may be similar to that described in US Pat. App. Pub. No. 2012-0070264 referenced above, the contents of which are incorporated herein by reference. One or more detectors may be positioned for detecting the height of the article stacks at each stacking position in the two side-by-side article rows, and a drive control module associated with the drive devices determines the sequence for selection of the stacking position for dispensing or discharging of each article according to the following steps:

detecting degree of filling in each stacking position in the two side-by-side rows of stacking positions in the storage compartment;

comparing degrees of filling;

selecting a discharge position on the basis of the comparison, so that articles are dispensed at stacking positions having a lower degree of filling. The controller controls the carriage drive to drive the carriage to a position corresponding to lower fill stacking position in one of the rows, and controls the second drive device or conveyor belt drive to dispense an article into the first or second row, depending on which row has more stacking capacity at that position to receive another article. The detector may be located on the carriage in order to collect information on the current degree of filling of the stacked rows of articles at each stacking position as the carriage is driven back and forth above the storage area.

In one embodiment, the carriage comprises a support frame having a rear end and a forward end, and the rear end of the article conveyor belt is spaced forward from the rear end of the carriage to provide a gap through which articles can fall off the rear end of the conveyor belt and onto a stacking position in the rear storage row. A guide plate is pivotally mounted on the carriage at a location spaced above the gap and is biased by a suitable biasing device into a forwardly inclined position in which a lower edge of the guide plate is at or adjacent the rear end of the article conveyor belt, to guide articles onto the conveyor belt when the carriage is in the first position below the article supplier. A locking mechanism is provided to lock the guide plate in the forwardly inclined position when it is under the article supplier. The guide plate is released when the carriage is moved away from the article supplier, so that an article driven rearward on the conveyor belt can push lower edge of the plate away from the rear end of the conveyor belt, and then fall through the gap into a stacking position. The biasing device then urges the guide plate back into the forwardly inclined orientation extending over the gap.

In one embodiment, a method for controlling distribution of articles into two rows of stacked articles in a storage compartment comprises selecting at least one stacking position in a storage compartment from two or more stacking positions in front and rear rows of article stacking positions in a storage compartment, receiving an article onto an article support mounted on a carriage movable back and forth in a horizontal carriage drive direction above the rows of article stacking positions, driving the carriage horizontally to a selected position in which the article support is located above the selected stacking position, and actuating an article dispenser to drive the article in a selected front or rear article direction transverse to the carriage drive direction to dispense the article off a front or rear end of the article support into the selected stacking position in the first or second row.

The carriage drive in one embodiment may be actuated to drive the transport platform back and forth along the entire length of the conveyor at predetermined intervals, so that a detector on the platform may collect information on the current heights of stacked articles at the stacking positions in the two rows, which is then processed by a controller in order to determine positions which have the most stacking capacity so as to select the next stacking position for receiving an article, with the objective of leveling the article stacking heights at each position.

The apparatus and method may be used in ice cube distribution machines for installation in supermarkets where the ice cubes are made in situ according to need, and are packed immediately into bags, before being distributed into a temperature controlled storage compartment under the ice cube machine.

The apparatus and method can be applied to other types of machines than ice cube distribution machines, where a large number of articles are produced centrally above a storage compartment in which the articles are to be evenly distributed in order to utilize the capacity of the storage compartment. Examples of such applications could be in connection with a plastic injection molding machine where a large number of articles are produced centrally, or in connection with packing and supplying other types of foods, e.g. vegetables or confectionery.

In a particularly simple way there is hereby achieved the ability of dispensing articles from an overhead conveyor into selected stacking positions in two side-by-side rows of stacking positions.

DESCRIPTION OF THE DRAWING

The invention will be explained in more detail below with reference to the accompanying drawings, where.

In the explanation of the Figures, identical or corresponding elements will be provided with the same designations in different Figures. Therefore, no explanation of all details will be given in connection with each single Figure/embodiment.

DETAILED DESCRIPTION

Certain embodiments as disclosed herein provide a method and apparatus for storing and dispensing serially produced article such as bags of ice from an article production unit into predetermined article stacking positions in an article storage area below the production unit, from which consumers can retrieve one or more articles. In one embodiment, the apparatus is an ice making, bagging and dispensing machine and the storage area is in a freezer compartment beneath ice making and bagging units of the machines with a bagged ice distributing unit positioned in the freezer compartment to receive bags of ice successively from the ice bagging unit and to discharge or distribute the bags at selected locations in the compartment so as to achieve a relatively even distribution of stacked bags of ice throughout the compartment.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

In the illustrated embodiment described below, the article distribution unit or apparatus is used to transport ice in bags one by one to selected positions above a storage area in a freezer or temperature controlled compartment, and to discharge or distribute the bags into stacks in the storage area. However, it will be understood that the same distribution apparatus may be used in other applications, for example in any serial production application where a large number of articles are produced centrally above a storage compartment in which the articles are to be evenly distributed in order to utilize the capacity of the storage compartment. Examples of such applications could be in connection with a plastic injection molding machine where a large number of articles are produced centrally, or in connection with packing and supplying other types of foods in bags or other containers, e.g. vegetables or confectionery.

Figure 1A:
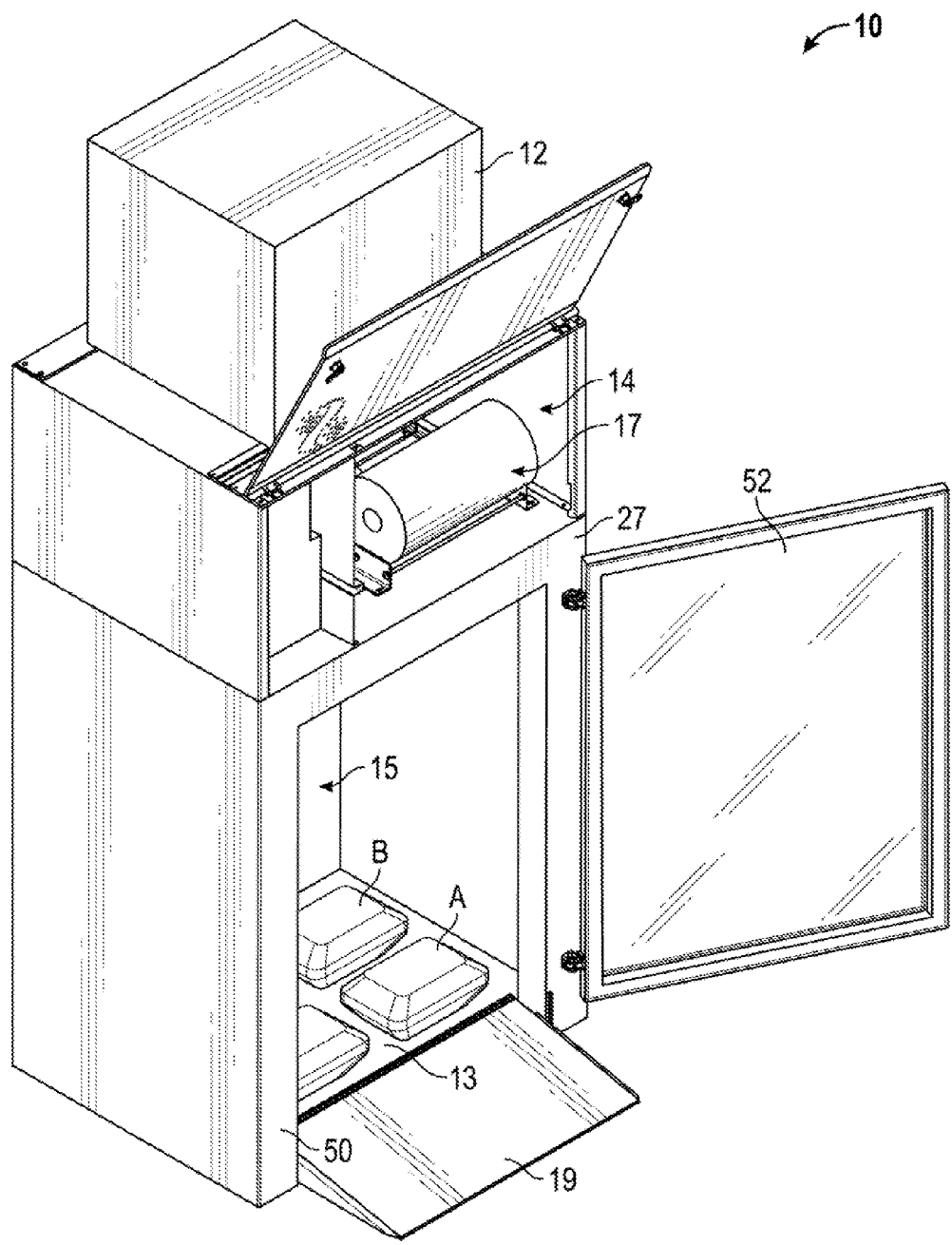
FIG. 1A is a perspective view of one embodiment of an apparatus or unit for storing and dispensing bags of ice, with the front door of a bagged ice storage compartment open to reveal the article conveyor and distribution unit.
Figure 1B:
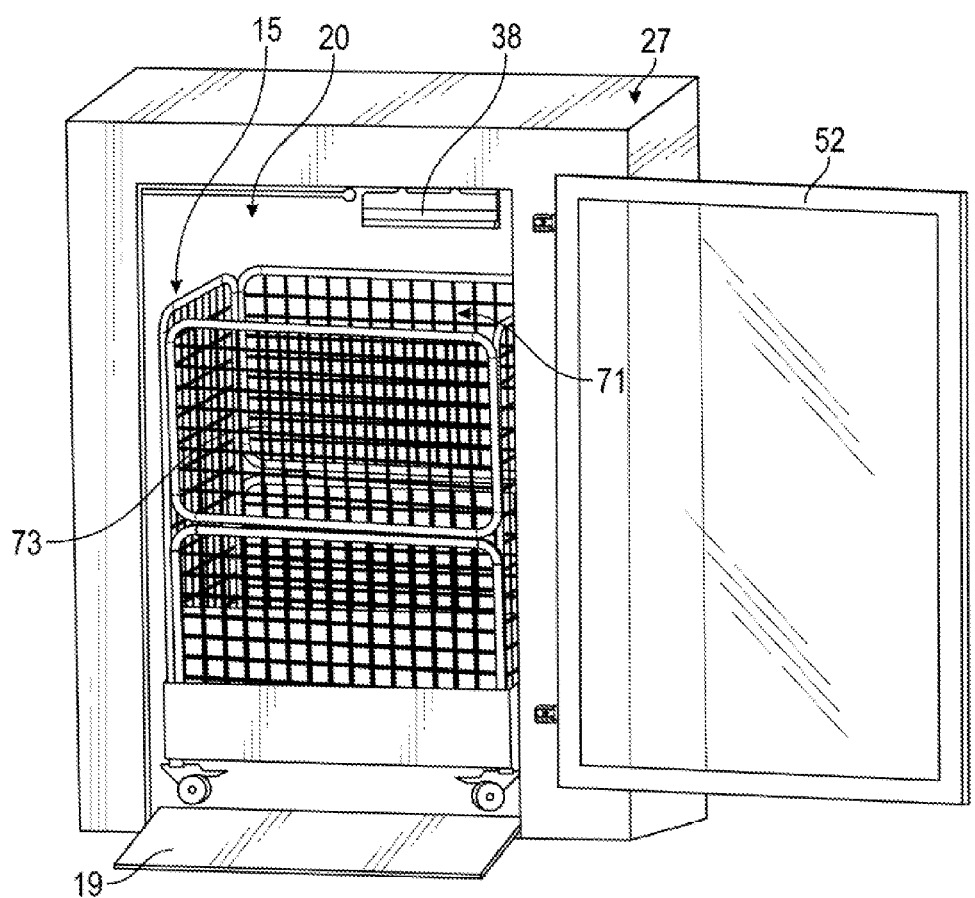
FIG. 1B is a perspective view illustrating the bagged ice storage compartment of FIG. 1A with a wheeled cart positioned in the compartment to receive bags of ice for dispensing or storage.
Figure 2:
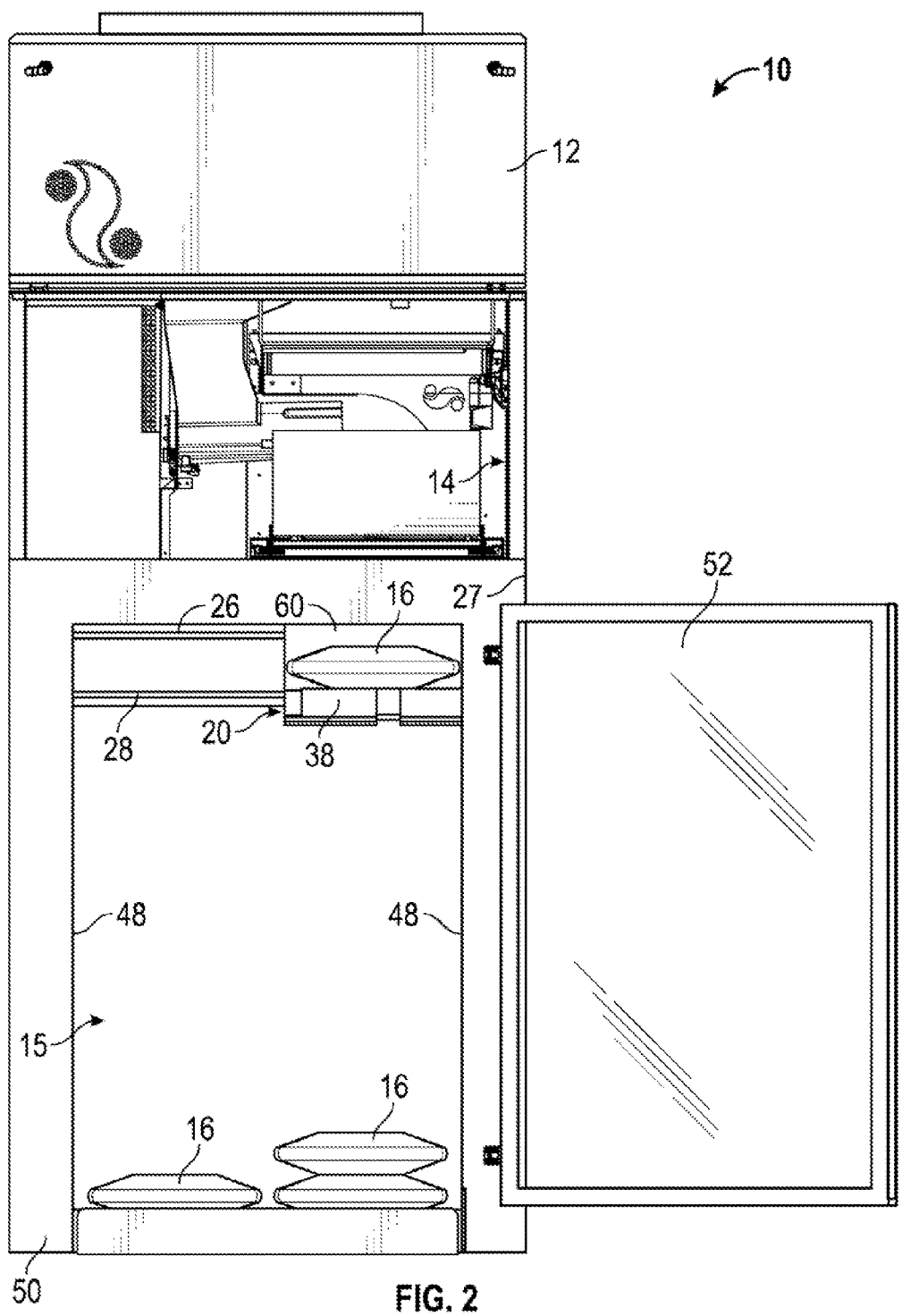
FIG. 2 is a front view of the ice bagging, storage and dispensing unit of FIG. 1A, illustrating the bag conveyor and distribution apparatus for distributing bagged ice into stacks in the storage area.
Figure 3:
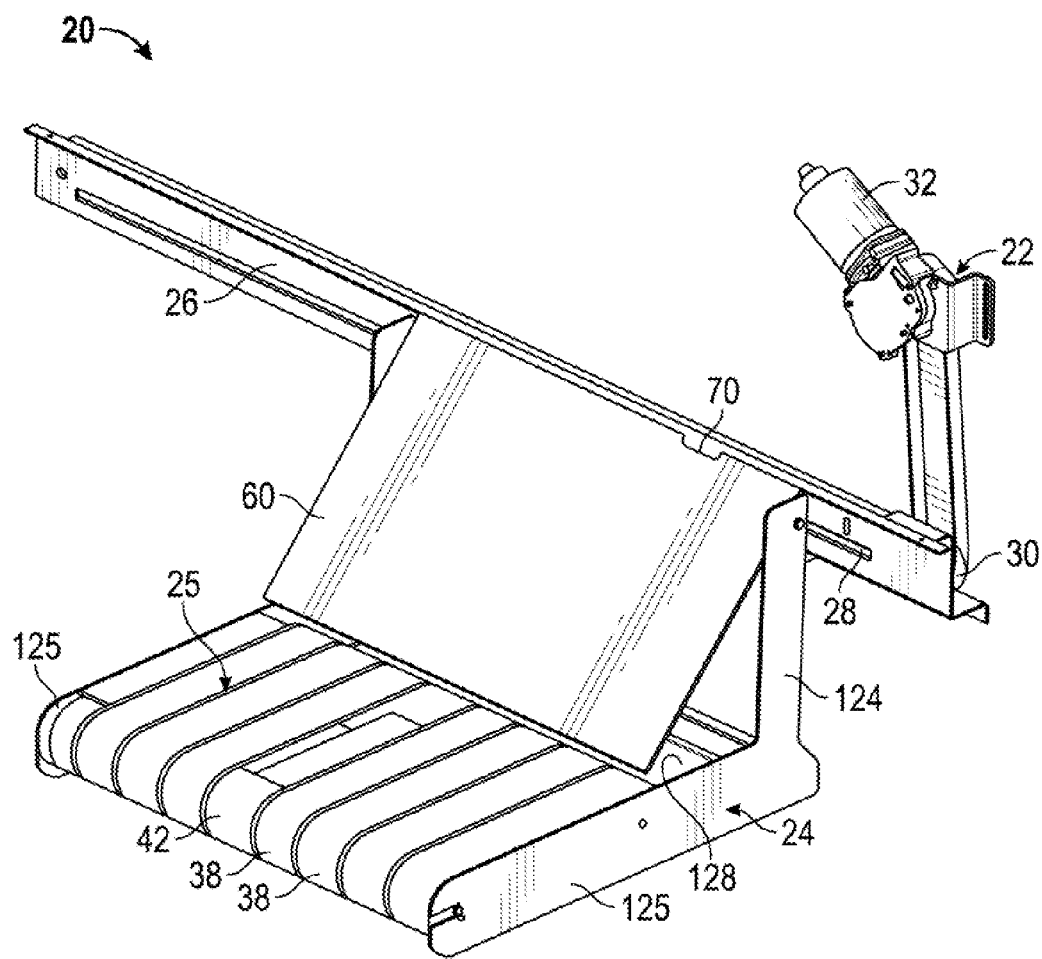
FIG. 3 is a perspective view of one embodiment of the bag conveyor and distribution apparatus of FIG. 2.

FIGS. 1A, 1B and 2 illustrate one embodiment of a bagged ice dispensing machine 10 which has an upper, ice making unit 12, an ice collecting and bagging unit 14, and a freezer storage compartment or merchandiser 15 beneath the ice collecting and bagging unit. FIG. 1B illustrates the bagged ice storage compartment or merchandiser alone, with an optional wheeled cart 71 for receiving bags of ice, as described in more detail below. The ice collecting and bagging unit 14 may be the same as described in U.S. Pat. No. 8,122,689, the entire contents of which are incorporated by reference herein.

The bagged ice dispensing machine 10 of this embodiment is a relatively small and compact unit, and a single ice making machine is located in the ice making unit 12, and dispenses ice in cubes or pieces into ice collectors which direct the ice in a transport path towards a bag making station 17, where the ice is collected into partially formed bags which are then sealed. Sealed bags 16 are dropped through an opening in divider or wall 27 onto a bagged ice distribution apparatus 20 mounted in the upper portion of the storage compartment, as described in more detail below. Bagged ice distribution apparatus 20 is located in a suitable position to collect bags of ice dispensed from the ice collecting and bagging unit 14, as illustrated in the drawings. The distribution apparatus 20 is configured to transport and drop bags of ice into stacks of bagged ice in two rows A, B (a front row and a rear row) in the floor 13 of refrigerated storage compartment 15 (FIG. 1A) or in a wheeled cart positioned in the storage compartment (see FIG. 1B). In the illustrated embodiment, the dimensions of storage compartment 15 are sufficient for storing two stacks of bagged ice in each row A, B, but the compartment 15 may be made wider in alternative embodiments if additional capacity is desired. Compartment 15 has a door 52 in front wall 50 for access to the interior of compartment 15 by customers or store personnel.

Fold up ramp 19 leading into compartment 15 allows a storage cart 71 to be wheeled into the storage compartment if desired, as illustrated in FIG. 1B, so bagged ice can be collected in the cart instead of deposited onto the floor 13. The cart can then easily be wheeled out and replaced with an empty cart when the desired fill capacity is reached and carts containing bags of ice may be stored in a freezer storage area at the back of the store for use in times of high demand, for example when the ice making machine cannot keep up with customer demand. Cart 71 has a drop or fold down upper front wall panel 73 which can be opened to allow access for customers to retrieve bags of ice from cart 71.

Figure 7A:
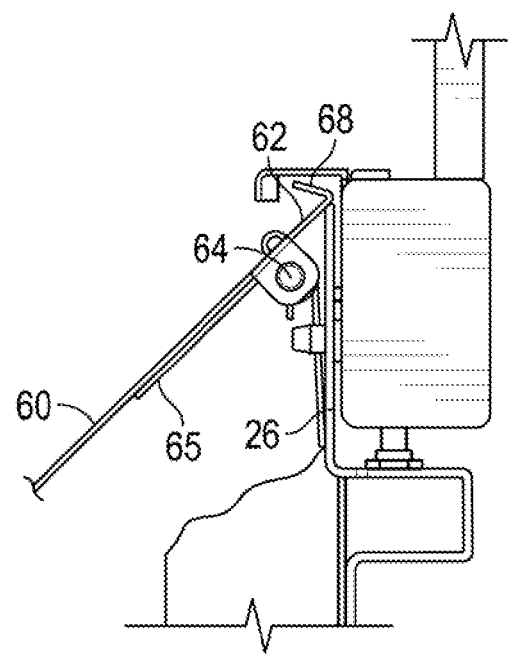
FIG. 7A is an exploded view of circled area in FIG. 6, illustrating the locked position of the locking mechanism.
Figure 7B:
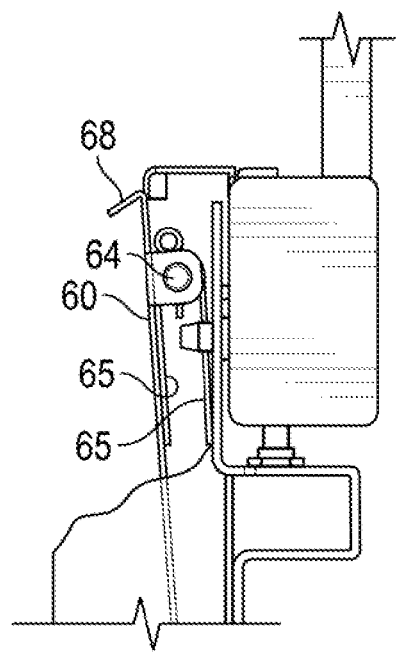
FIG. 7B is an exploded view similar to FIG. 7A illustrating the released position of the guide plate with the plate urged into a generally vertical orientation.
Figure 8:
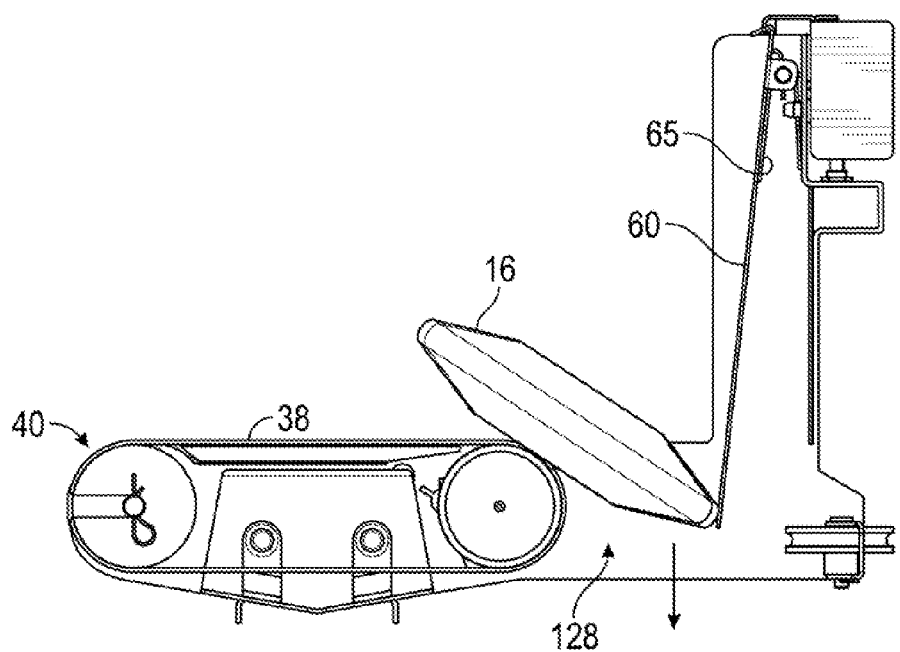
FIG. 8 is a side elevation view of the carriage similar to FIG. 6 but with the guide plate in the released position and biased by a bag being driven off the rear end of the bag support or conveyor into the generally vertical orientation.
Figure 9:
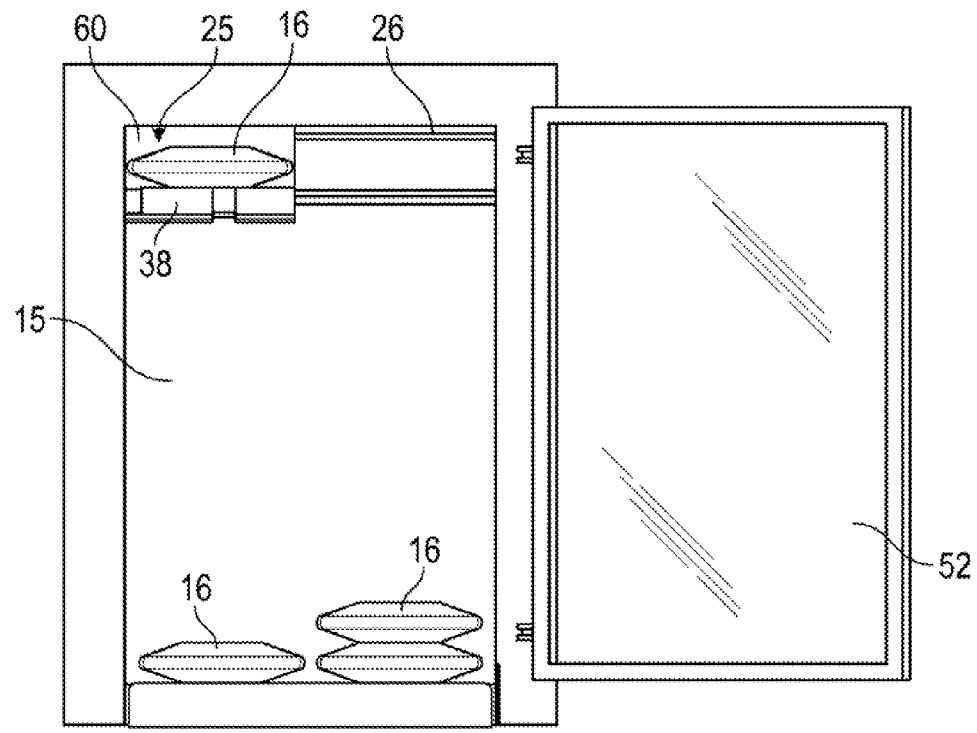
FIG. 9 is a front elevation view of the storage compartment of the apparatus of FIGS. 1A to 8, illustrating bags stacked in the storage compartment while a bag is positioned on the bag carriage prior to distribution into a selected bag stacking position.

FIGS. 3 to 9 illustrate one embodiment of article distributing apparatus or unit 20 in more detail. Apparatus 20 is designed to distribute bagged ice or other serially manufactured articles to desired stacking locations in a storage compartment such as compartment 15 of FIGS. 1A and 2. In the illustrated embodiment, compartment 15 is also a merchandiser or dispenser from which customers can retrieve articles such as bags of ice for purchase. As noted above, dividing wall 27 is provided between the ice collecting and bagging unit 14 and the storage or freezer compartment 15. The apparatus 20 is mounted in an upper portion of the storage compartment above the storage area and beneath the ice bagging unit 14. As illustrated in FIGS. 2 to 10, apparatus 20 basically comprises a horizontal conveyor 22, a carriage 24 mounted on the conveyor and movable back and forth in a horizontal direction between opposite sides 48 of the compartment on the conveyor, and a bag or article support 25 mounted on carriage 24 for distributing bags into spaced front and rear rows of stacked bags in the storage area, as described in more detail below. In FIG. 9, the carriage 24 is positioned in a start position for receiving a bag of ice 16 dropped from ice bagging unit 17 through an opening in dividing wall 27 and received onto support 25.

The horizontal conveyor 22 comprises a back plate or mounting plate 26 having a rail or track 28 on which the carriage 24 is slideably mounted (see FIG. 3), an endless conveyor belt or chain 29 extending around rollers 30 at opposite ends of the track, with the carriage 24 suitably linked to the chain in a known manner, and a first drive device or gear motor 32 mounted at one end of back plate 26. Motor 32 drives one of the rollers 30 which acts as a drive roller for the conveyor belt.

Figure 4:
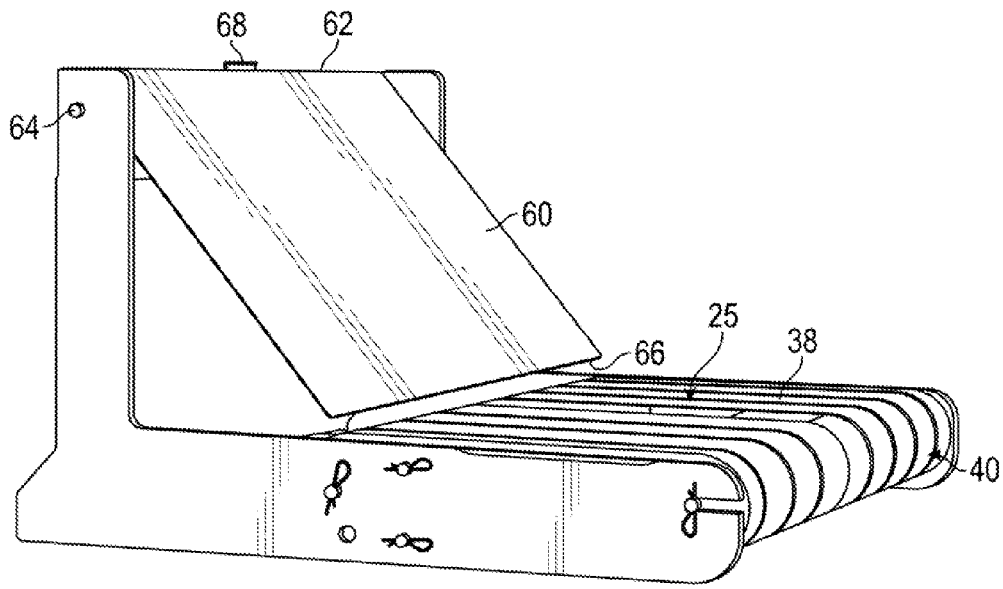
FIG. 4 is a side perspective view of the carriage of the bag conveyor and distribution apparatus of FIG. 3.
Figure 5:
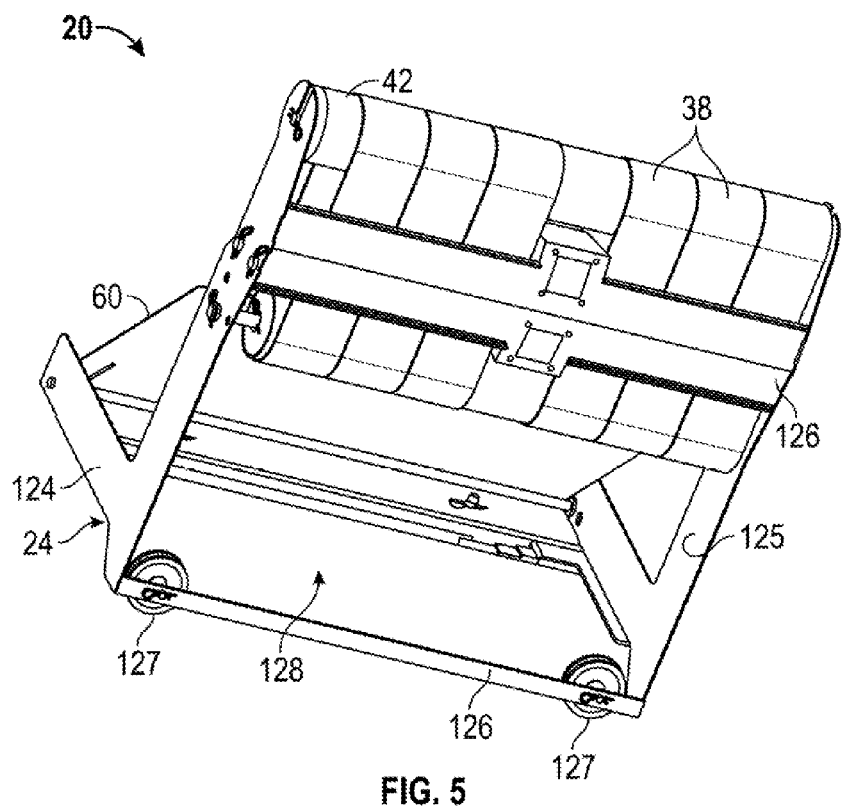
FIG. 5 is a bottom perspective view of the carriage of FIG. 4.
Figure 6:
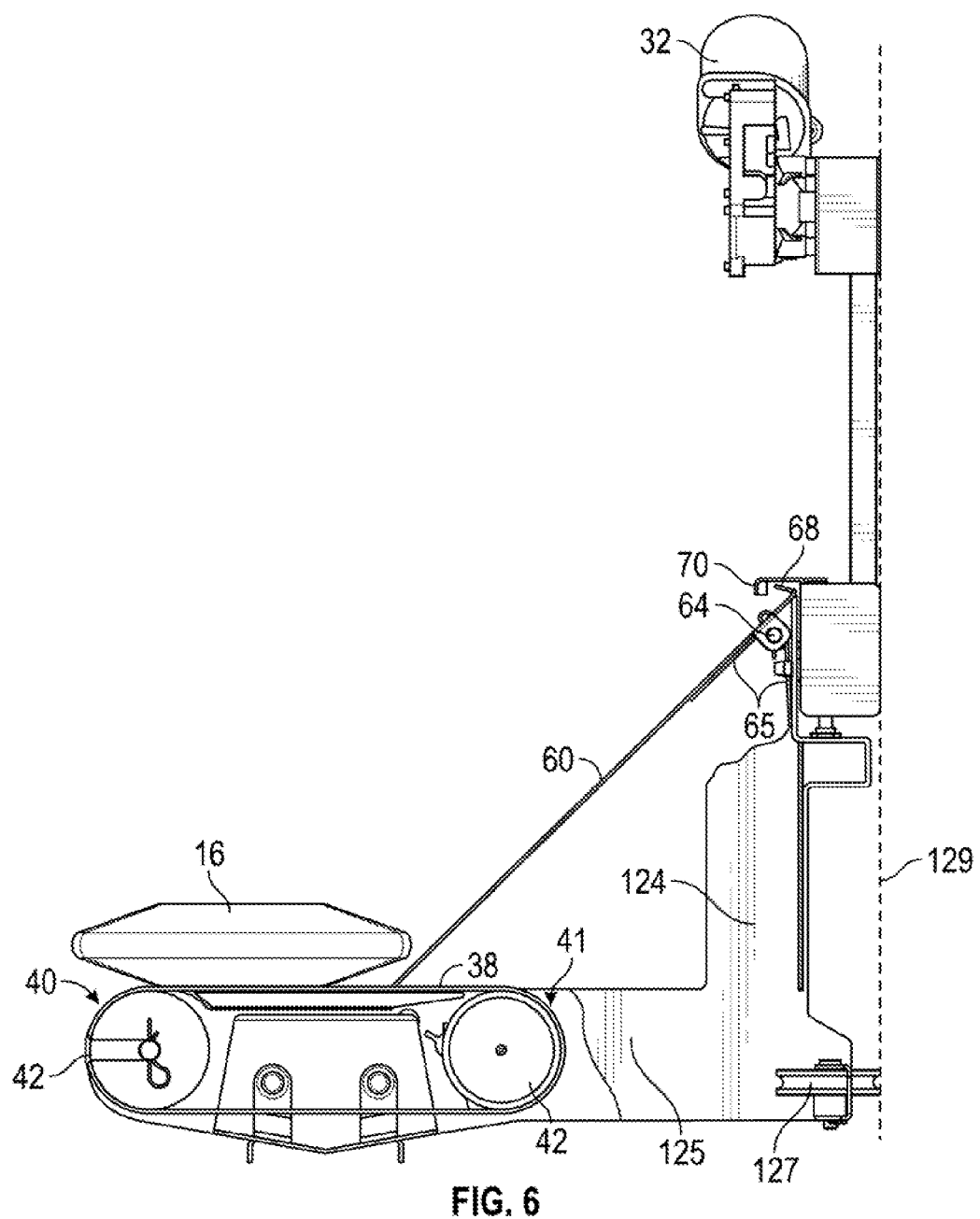
FIG. 6 is a side elevation view of the bag conveyor and distribution apparatus of FIG. 3, partially cut away to reveal the locking mechanism which locks the guide plate in the inclined position for receiving a new bag of ice for distribution.

As best illustrated in FIGS. 3 to 6, carriage 24 is generally L-shaped with a rear, generally vertical portion 124 linked to the endless conveyor belt or chain to travel along track 28, and a lower, forwardly projecting portion comprising a pair of parallel support arms 125 with cross bars 126 extending between arms 125 beneath article support 25. Guide rollers 127 at opposite ends of rear cross bar 126 engage the rear wall 129 of compartment 15 to guide carriage 24 and maintain it in the proper orientation as it is driven back and forth along track 28, as best illustrated in FIGS. 5 and 6.

In the illustrated embodiment, the article support comprises an article distributor or endless conveyor 38 mounted between arms 125 for conveying bags or other articles in forward and rearward drive directions transverse to the carriage drive direction and off front and rear ends 40, 41 of the conveyor into the front or rear row A, B of stacked bags, depending on the drive direction of conveyor belts 38. Conveyor belts 38 extend around guide rollers or wheels 42 rotatably mounted between arms 125, as best illustrated in FIGS. 4, 5 and 6. One of the rollers 42 is a drive roller which is driven by a reversible bag or discharge conveyor drive or gear motor 44. In the illustrated embodiment, the article or bag support comprises a plurality of side-by-side conveyor belts 38 each extending around a respective pair of rollers 42 at the front and rear end of the platform, but alternative conveyors such as a single, wider endless conveyor belt or band on which a bag is carried may be provided in alterative embodiments. In other alternative embodiments, the article distributor may be a reversible pusher device or the like rather than a conveyor belt on which the article is carried. As best illustrated in FIGS. 3 to 6, the rear end 41 of article support or conveyor 38 is spaced forward from the rear portion 124 of carriage 24, leaving a gap 128 allowing the article or bag to be dropped through the gap between the rear end 41 of the conveyor and the rear portion 124 of carriage 24.

Opposite ends 40, 41 of the bag conveyor 38 are rounded, as illustrated in FIG. 6, which tends to overturn bags of ice as they are dropped off the conveyor, as described in more detail below. Detectors 45 (FIG. 10) may be mounted on the lower face of carriage 24 to detect the height of stacked bags in two storage rows, as described in more detail below. Additional detectors (not illustrated) may be located at different positions on the platform. Other detectors may be associated with each of the conveyors and the drive devices to provide input to a controller so that the carriage and platform can be moved to the desired positions based on programming of the controller and input from the various detectors, as discussed in more detail below in connection with FIGS. 10 and 11. Alternatively, stationary detectors on the lower face of wall 27 may be positioned to detect bag height in each of the bag receiving positions in each row.

A tilted guide plate 60 extends between the upper end of the rear, vertical portion 124 of carriage 24 and the conveyor or bag support 25. Plate 60 has an upper end 62 pivotally mounted on the rear upright portion 124 of the carriage via pivot or hinge 64, and is biased outwardly into a forwardly inclined orientation by spring 65 extending around the hinge and acting between the rear face of plate 60 and the front of back plate 26, as best seen in FIGS. 6, 7A and 7B. When in the fully extended inclined orientation of FIGS. 4, 6 and 7A, the lower edge 66 of plate 60 is located above the rear of conveyor 38, blocking gap 128. When the carriage is located beneath the article supplier or ice bagging unit 17, as in FIGS. 3 and 7A, locking tab 68 on the upper edge of plate 60 is positioned behind downwardly directed locking tab 70 on back plate 26. This locks the plate 60 in the inclined, guide position when a bag is dropped from the bagged ice supply unit above, guiding the bag 16 smoothly onto bag support or conveyor belt 38 into the support position illustrated in FIG. 6. When the carriage is moved horizontally away from this position by more than one to two inches, the tab 68 is no longer behind locking tab 70, and the plate is then only held in the inclined position by spring 65. Thus, when a bag 16 on the conveyor 38 is driven towards the rear end 41 of the conveyor or support, as illustrated in FIG. 8, the bag contacts the lower end of plate 60, and pushes the lower end of the plate rearward toward a retracted, generally vertical position against the action of spring 65, in a similar manner to a spring loaded letter box flap, and into the position illustrated in FIGS. 7B and 8, so that the bag can fall down through the gap 128 onto the rear row of stacked bags. Once the bag falls down through gap or opening 128, the compressed spring 65 is released and springs outward into the position of FIG. 7A, returning the plate to the forwardly inclined orientation of FIGS. 3, 4 and 6.

Figure 10:
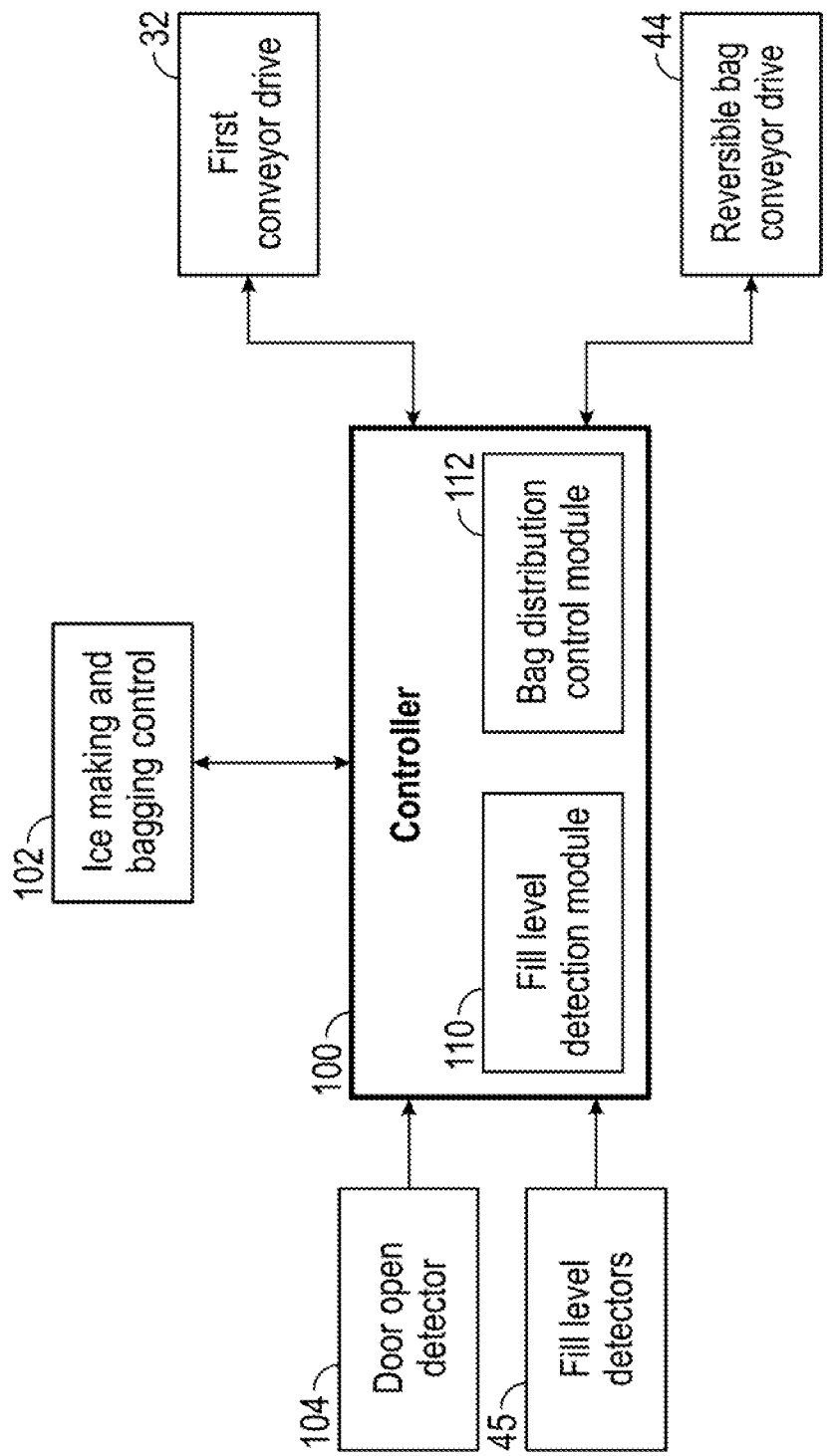
FIG. 10 is a block diagram illustrating one embodiment of a control system for controlling operation of the bag conveyor and distribution apparatus of FIGS. 1A to 9.

A partially formed bag at bag forming and filling station in the unit 14 is filled with ice until a predetermined weight is reached. During filling, the lower end of the bag is suspended through the opening between units 14 and 15 above inclined guide plate 60, so that the ice is within the freezer compartment, to reduce melting. At the start of a bag distribution procedure, the carriage 24 is located in a first or start position beneath unit 14, with plate 60 locked in the forwardly inclined guide position. When the desired weight of ice in bag 16 is reached, more film is fed to the bag forming and filling station and the partially filled bag is lowered onto guide plate 60 and released, sliding down along plate 60 and onto the conveyor 38. The platform conveyor drive 44 may be actuated to drive the conveyor 38 forward to transport the bag from plate 60 fully onto support or conveyor 38. In one embodiment, operation of the components of unit 14 and unit 20 during positioning of a bag on the platform prior to distribution into the compartment 12 are controlled and coordinated by an ice making and bagging controller 102 and bag distribution controller 100 as illustrated in FIG. 10. The ice making and bagging controller 102 is described in U.S. Pat. No. 8,122,689 referenced above and incorporated herein by reference, and reference is made to that application for a detailed description of controller 102.

The storage compartment 15 in the illustrated embodiment is of predetermined dimensions for providing front and rear rows A, B of bag storage positions, with two bag stacks in each row. Bags may be dropped into the base of the compartment, as illustrated in FIG. 1, or into a wheeled storage cart 71 positioned in the compartment beneath the bag distributing unit 20, as in FIG. 1A. A greater or lesser number of storage positions may be provided in alternative embodiments, depending on the dimensions of the storage compartment. FIG. 10 illustrates one embodiment of a control system which controls the sequence of bag dropping into the storage positions so as to maintain the height of stacked bags at each storage position approximately level. The control system is similar in some respects to that described in US Pat. App. Pub. No. 2012-0070264 referenced above, the contents of which are incorporated herein by reference, with the main difference being the fact that no carriage rotatable drive or control for such a drive is needed in the system of this embodiment. Controller 100 has a fill level detection module 110 which is programmed to periodically monitor the height of stacked bags at each storage position based on input from detectors 45 as the bag support carriage 25 is driven horizontally back and forth between opposite sides of the compartment, and to calculate the positions with the lowest fill level. Controller 100 further comprises a distribution control module 112 which controls the first drive device 32 which drives carriage back and forth above the storage area, and the bag conveyor drive motor 44 to drive the bag conveyor belts 38 in a forward or rearward direction to drop the bag into a selected drop or discharge position above a storage position in the front or rear row selected based on the current fill level information from module 110 or based on a pre-selected bag drop sequence. Detector information for use in selection of the next discharge position may be gathered both as the platform is being driven to a currently selected bag discharge position, and in periodic detection sequences in which the platform is driven along the entire length of each row while empty. The objective is leveling of the multiple bag stacks. Different storage positions may have an order of preference such that when different storage positions have about the same fill level or are empty, the controller selects a discharge position using the order of preference.

One or more door opening detectors 104 may be associated with the door 52 for detecting opening of the doors, as described in U.S. Pat. No. 8,122,689 and US Pat. App. Pub. No. 20120070264 referenced above. The controller 100 also monitors the number of times a door is opened and may initiate a fill level detection sequence if the bag is opened more than a predetermined number of times within a certain time period, and may also provide a control signal to ice making and bagging controller 102 increase the speed of the ice making, bag making and bag filling procedure in times of increased purchase of bagged ice, for example during holiday seasons and in hot weather. Controllers 100 and 102 are also configured to switch off the ice making, collecting and bagging as well as the bag distribution unit 20 while a door is open, since bags should not be dropped into the compartment 15 while a customer is retrieving one or more bags of ice, as well as when the storage compartment is full to the desired capacity at each bag stacking position. As noted above, if a cart 71 is used to collect bags of ice, ice making, collecting, bagging and distribution is switched off if the cart is full to a desired capacity, for example to allow a store employee to retrieve the loaded cart and replace it with an empty cart.

In one embodiment, each detector 45 may be a proximity or distance detector such as an infra red (IR) sensor, a photoelectric sensor, or the like which detects the height of successive stacks of bags in each of the rows and provides the height or fill level information to the controller 100, which stores the information and also determines a current bag drop sequence based on the fill level information. The detector may simply detect whether or not a stack of bags is at the desired maximum height, or may determine distance to the top of a stack, so that the controller or processor 100 can determine if a storage position is completely empty, as well as the approximate bag stack height or amount of fill of the stack. The latter is preferred since the controller may then be programmed to control the distributing apparatus 20 to maintain the stacks as level as possible, i.e. dropping bags at selected locations to keep the stack heights relatively even. The sensors on the platform support arm 33 are positioned so that stack heights at aligned positions in both rows may be determined simultaneously.

In one embodiment, the lowest points detected by detectors 45 are stored and sent to controller 100 for determining the bag delivery or distribution sequence. The bag delivery sequence is controlled to drop bags at the lowest detected positions from the previous sensing sequence, and to try to maintain the bag stacks at approximately the same heights. Sensing may be performed during bag distribution on wherever a predetermined number of door openings is detected.

If the compartment or cart is filled to the desired capacity, the ice making and bagging unit 14 and distributor apparatus or unit 20 may be turned off until bags have been removed and re-filling is required. Unit 14 and the bag distributing unit or apparatus 20 are also turned off when a door open detection signal is received, so that bags are not dropped into the freezer compartment when a customer is attempting to remove one or more bags of ice for purchase.

Figure 11:
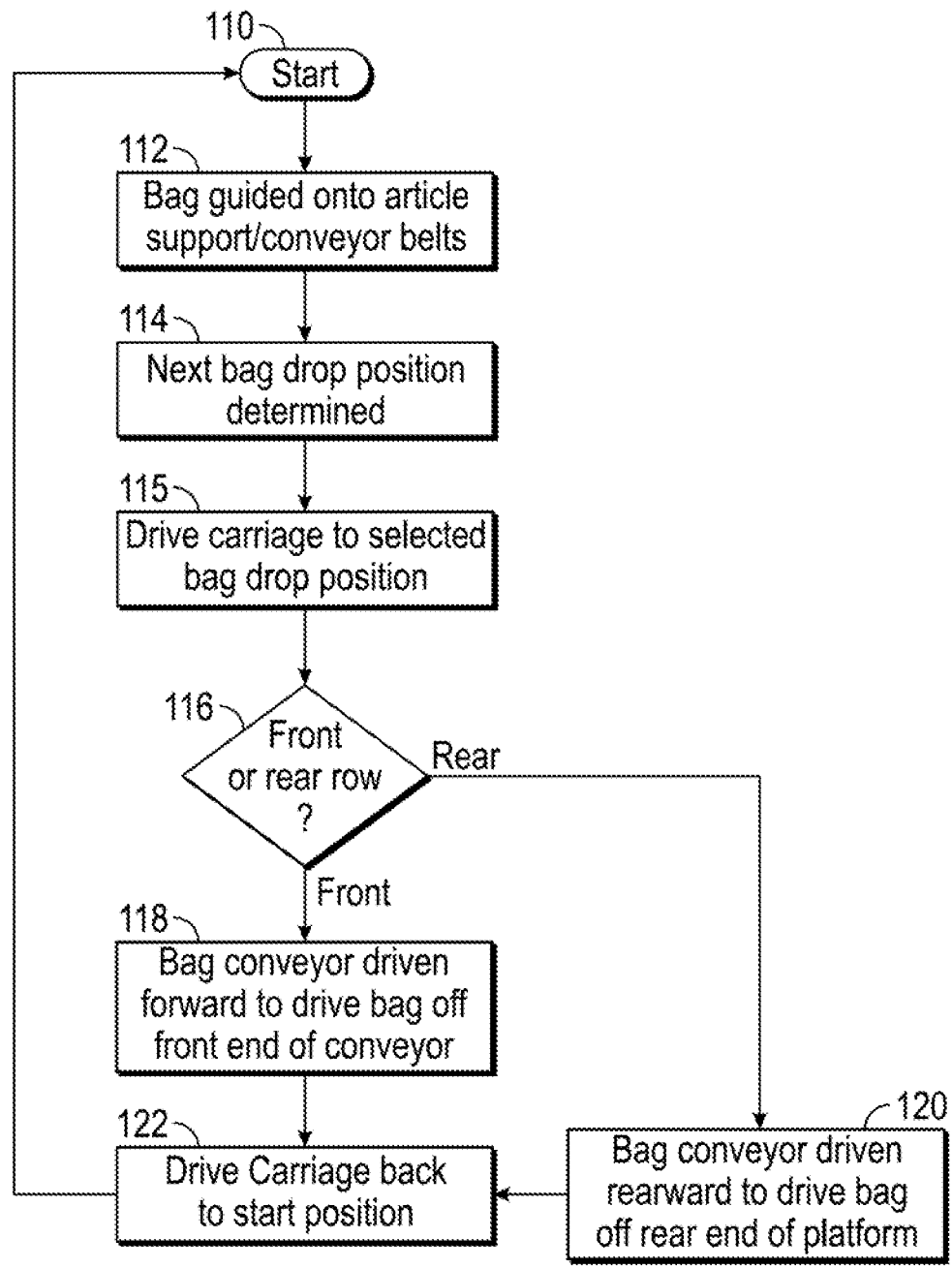
FIG. 11 is a flow diagram illustrating one embodiment a method of operating the bag distribution apparatus of FIGS. 1A to 10.

One embodiment of a bag transport and discharge method using the apparatus of FIGS. 1A to 10 is illustrated in the flow diagram of FIG. 11. On start up of the machine 10 (step 110), ice making and bagging is controlled by the controller 102 of unit 14, while bag distribution controller 100 of FIG. 12 controls bag transport and distributing unit 20. FIG. 2 illustrates a bag 16 which has just dropped down onto the bag support or conveyor 25 which is positioned in a start position immediately under an opening in wall 27 between ice making and bagging unit 14 and storage compartment 15. In one embodiment, the opening may be located under the bag forming and filling station of the ice making and bagging unit so that a filled bag extends through the opening onto guide plate 60 before the upper end of the bag is sealed and cut. As described above, the lower end of the bag may rest on the guide plate during the sealing and cutting procedure. Once sealing and cutting is complete, the bag of ice slides down inclined guide plate 60 onto bag support 38 (step 112). A suitable detector (not illustrated) may be located on the platform to detect when a bag is received on the platform, or a signal from the bag forming and filling station may be sent to controller 100 each time a bag is sealed and cut off. If needed, the bag conveyor 38 may be driven forward a short distance so as to drive the bag into a horizontal orientation on the platform.

The next storage position for dropping or discharging the bag from conveyor 38 is then selected using information from the detector sensing sequence (step 114). Once a drop position has been selected, the controller actuates the first or carriage conveyor drive 32 to drive the carriage to the selected drop position (step 115). The carriage conveyor drive 32 is then turned off. If the selected bag drop position is in the front row (step 116), the bag conveyor drive or second drive device 44 is driven forwards so as to move conveyor 38 in a forward direction until the bag drops off the front end 40 of the conveyor (step 118). Bags tend to turn over as they fall off the front end of the conveyor and drop down into the selected stacking position in the front row. If the selected bag drop position is in the rear row, the conveyor or second drive device 44 is reversed so as to move the conveyor 38 in a rearward direction (step 120) until the bag pushes the guide plate 60 aside and drops from the rear end 41 of the platform through gap 128 and into a stacking position in the rear row. The first drive device 32 is then actuated to drive the carriage back to the start position under the bag supplier (step 122), and the process is repeated. At any stage, the process may be stopped if a door open condition is detected or if the ice stacks are at the selected capacity or height, and is re-started once the door is closed or the height of stacked bags is reduced to a predetermined level.

The method and apparatus described above allows bags filled with ice or other serially produced articles to be successively delivered to storage positions in front and rear rows of storage positions, without changing the direction of the bag support or conveyor. Rather than being randomly and inefficiently stacked in a single pile forming a pyramid, the bags are relatively evenly distributed in separate stacks across the entire storage area, increasing storage capacity.

The number of storage positions in each row depends on the bag size and the width of the storage compartment, with a small storage compartment having two to six storage or bag stacking positions per row, but a greater or lesser number of storage positions may be provided in alternative embodiments, depending on the size of the bag or article to be distributed, as well as the dimensions of the storage compartment 15. In the illustrated embodiment, the apparatus is designed so that bags are oriented horizontally on the conveyor 38 with a first face facing upwards as the carriage is driven to a drop off position. The rounded ends 40 and 41 are designed so that bags tend to rotate as they are rolled off the platform, flipping or turning over and dropping into an underlying pile of bags with a second face facing upwards. The arrangement is such that bags tend to always flip through one half revolution as they fall off the platform, and land in the same orientation on top of each stack, regardless of the stack height. This helps to maintain even stacking of bags in adjacent stacks or piles along the length of each row, while allowing a desired face of the bag with consumer information to face upwards to provide information to consumers considering purchase. Since bags rotate inward as they rotate off the ends of the bag conveyor, rather than outward, the space between bags stacked in the front and rear rows is less than the conveyor length, i.e. the space between the front and rear ends 40, 41 of the conveyor. For example, if the conveyor length is around 9 inches, the gap between the front and rear rows of stacked bags is around three inches, or ⅓ of the conveyor length. Thus, space in the storage compartment is conserved while providing a simple and efficient mechanism for dropping bags into two side-by-side rows. In one embodiment, the front end of the article conveyor or support is positioned above the center of the front row, while the rear end is positioned above the center of the rear row.

The article distribution apparatus and method described above organizes products in substantially uniform stacks so that it is relatively easy for customers to pick up a product such as a bag of ice. This also increases storage capacity by up to 50%, and reduces labor costs previously incurred when personnel had to manually level uneven stacks of bagged ice. The degree of filling of the compartment can be remotely monitored with the monitoring used to control both ice making and bag distribution. This allows quicker start up and more efficient utilization of the ice making units, which can be turned off when monitoring indicates that the storage compartment is completely full, and re-started as soon as the level of stacked bags is detected to be uneven or low.

The article distribution method and apparatus is described above in connection with an ice machine in which ice chunks or cubes are made, collected, directed into partially formed bags at a bag making and filling station, and the bagged ice is then dropped onto the distribution apparatus for distribution into a storage compartment to form substantially uniform and even stacks of bagged ice. However, the apparatus and method may also be used in other applications where a large number of articles are produced centrally above a storage compartment in which the articles are to be evenly distributed, in order to utilize the capacity of the storage compartment. Examples of such applications are plastic injection molding machines where a large number of articles are produced centrally, or in connection with packing and supplying other types of articles or foods in bags or other containers, e.g. vegetables, snack foods, confectionary, office supplies, electronic components, or the like. For non-food articles, the storage compartment may not need to be temperature controlled. In each case, the articles may be dispensed into a storage compartment at a store which also acts as a merchandiser for the articles, or in a storage facility where the articles may be later packaged and shipped.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be hardware such as a microprocessor, or any processor, controller, or microcontroller, and the processing can be performed on a single piece of hardware or distributed across multiple servers or running on multiple computers that are housed in a local area or dispersed across different geographic locations. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method of operating a system for distributing a plurality of articles into a storage unit, comprising:
distributing an article of the plurality of articles onto an article support on a transport carriage of an article distributing apparatus positioned in a start position above a storage area within the storage unit, the storage area having opposite sides, a front, and a rear, and the article support having a front end and a rear end;
selecting a storage position in the storage area from at least two adjacent article storage positions in front and rear rows beneath the article support;
positioning the article on the article support;
driving the carriage in a reversible horizontal carriage transport direction to a location above the selected storage position;
actuating an article distributor to transport the article in a first horizontal article transport direction towards the front of the storage area and transverse to the carriage transport direction off the front end of the article support if the selected storage position is in the front row and in a second horizontal article transport direction opposite to the first horizontal article transport direction off the rear end of the article support if the selected storage position is in the rear row;
when the article is transported in at least one of the first and second horizontal article transport directions, pivoting a guide from a first position in which a lower edge of the guide is adjacent the article support to a second position in which the lower edge of the guide is spaced from the article support so that the article falls through a gap that is at least partially defined between the article support and the lower edge of the guide;
driving the transport carriage back to the start position to receive a subsequent article to be distributed into the storage area; and
repeating the foregoing steps to distribute the plurality of articles one by one to selected storage positions in the storage area;
wherein the guide is inclined; and
wherein the step of positioning each article comprises guiding the articles along the inclined guide and onto the article support.

2. The method of claim 1, wherein the article support comprises a conveyor belt and the article distributor comprises a reversible drive device configured to drive the belt in opposite forward and rearward directions, and the step of transporting the article selectively off the front and rear of the platform comprises activating the drive device to drive the belt in a forward direction to drive the article of the plurality of articles off the front end of the conveyor belt and activating the drive device to drive the belt in a rearward direction to drive the article of the plurality of articles off the rear end of the conveyor belt.

3. The method of claim 1, further comprising positioning a wheeled cart in the storage unit to define a storage area for receiving articles distributed by the article distribution apparatus, whereby articles are selectively stacked in front and rear stacking positions in the wheeled cart.

4. The method of claim 1, wherein the front and rear storage rows each have two storage positions for receiving stacked articles.

5. The method of claim 1, wherein the articles are bags of ice received from an ice making and bagging machine and the storage area comprises a temperature controlled storage unit.

6. The method of claim 1, further comprising positioning each article received on the article support in a horizontal orientation with a first face of the article upwards prior to driving the carriage to the selected storage position.

7. A method of operating a system for distributing a plurality of articles into a storage unit, comprising:
distributing an article of the plurality of articles onto an article support on a transport carriage of an article distributing apparatus positioned in a start position above a storage area within the storage unit, the storage area having opposite sides, a front, and a rear, and the article support having a front end and a rear end;
selecting a storage position in the storage area from at least two adjacent article storage positions in front and rear rows beneath the article support;
driving the carriage in a reversible horizontal carriage transport direction to a location above the selected storage position;
actuating an article distributor to transport the article in a first horizontal article transport direction towards the front of the storage area and transverse to the carriage transport direction off the front end of the article support if the selected storage position is in the front row and in a second horizontal article transport direction opposite to the first horizontal article transport direction off the rear end of the article support if the selected storage position is in the rear row;
when the article is transported in at least one of the first and second horizontal article transport directions, pivoting a guide from a first position in which a lower edge of the guide is adjacent the article support to a second position in which the lower edge of the guide is spaced from the article support so that the article falls through a gap that is at least partially defined between the article support and the lower edge of the guide;
driving the transport carriage back to the start position to receive a subsequent article to be distributed into the storage area; and
repeating the foregoing steps to distribute the plurality of articles one by one to selected storage positions in the storage area;
wherein the articles are bags of ice received from an ice making and bagging machine and the storage area comprises a temperature controlled storage unit;
wherein the method further comprises positioning each bag received on the article support in a horizontal orientation with a first face of the bag upwards prior to driving the carriage to the selected storage position;
wherein the guide is inclined; and
wherein the step of positioning each bag comprises guiding bags along the inclined guide from the ice making and bagging machine and onto the bag support.

8. The method of claim 7, wherein the article support comprises a conveyor belt and the article distributor comprises a reversible drive device configured to drive the belt in opposite forward and rearward directions, and the step of transporting the article selectively off the front and rear of the platform comprises activating the drive device to drive the belt in a forward direction to drive the article of the plurality of articles off the front end of the conveyor belt and activating the drive device to drive the belt in a rearward direction to drive the article of the plurality of articles off the rear end of the conveyor belt.

9. A method of operating a system for distributing a plurality of articles into a storage unit, comprising:
- distributing an article of the plurality of articles onto an article support on a transport carriage of an article distributing apparatus positioned in a start position above a storage area within the storage unit, the storage area having opposite sides, a front, and a rear, and the article support having a front end and a rear end;
- selecting a storage position in the storage area from at least two adjacent article storage positions in front and rear rows beneath the article support;
- driving the carriage in a reversible horizontal carriage transport direction to a location above the selected storage position;
- actuating an article distributor to transport the article in a first horizontal article transport direction towards the front of the storage area and transverse to the carriage transport direction off the front end of the article support if the selected storage position is in the front row and in a second horizontal article transport direction opposite to the first horizontal article transport direction off the rear end of the article support if the selected storage position is in the rear row;
- when the article is transported in at least one of the first and second horizontal article transport directions, pivoting a plate from a first position in which a lower edge of the plate is adjacent the article support to a second position in which the lower edge of the plate is spaced from the article support so that the article falls through a gap that is at least partially defined between the article support and the lower edge of the plate;
- driving the transport carriage back to the start position to receive a subsequent article to be distributed into the storage area; and
- repeating the foregoing steps to distribute the plurality of articles one by one to selected storage positions in the storage area;
- wherein the article distributing apparatus further comprises a track to which the transport carriage is operably coupled;
- wherein the transport carriage comprises:
  - a first vertical portion extending downward from the track; and
  - a first arm connected to the first vertical portion and adjacent the article support;
- wherein the article support is located vertically below the track;
- wherein the plate extends downward from the track and towards the article support located vertically below the track; and
- wherein the plate is operably coupled to the first vertical portion and adapted to pivot in relation thereto from the first position in which the lower edge of the plate is adjacent the article support to the second position in which the lower edge of the plate is spaced from the article support.

10. The method of claim 9, wherein the transport carriage further comprises:
- a second vertical portion extending downward from the track and spaced in a parallel relation from the first vertical portion; and
- a second arm connected to the second vertical portion and adjacent the article support;
- wherein the plate is operably coupled to the second vertical portion so that the plate is positioned between the first and second vertical portions; and
- wherein, when the plate pivots from the first position in which the lower edge of the plate is adjacent the article support to the second position in which the lower edge of the plate is spaced from the article support, the plate pivots in between the first and second vertical portions.

11. The method of claim 10, wherein the articles are bags of ice received from an ice making and bagging machine and the storage area comprises a temperature controlled storage unit.

12. The method of claim 10, wherein the article support comprises a conveyor belt and the article distributor comprises a reversible drive device configured to drive the belt in opposite forward and rearward directions, and the step of transporting the article selectively off the front and rear of the platform comprises activating the drive device to drive the belt in a forward direction to drive the article of the plurality of articles off the front end of the conveyor belt and activating the drive device to drive the belt in a rearward direction to drive the article of the plurality of articles off the rear end of the conveyor belt.

* * * * *